United States Patent
Roosli et al.

(10) Patent No.: US 10,297,124 B2
(45) Date of Patent: May 21, 2019

(54) INTERFACE ASSEMBLY

(71) Applicant: Honeywell International Inc., Morris Plains, NJ (US)

(72) Inventors: Philipp Roosli, Niantic, CT (US); Ryan M. Gardner, Niantic, CT (US); Ravi M. Sagar, East Lyme, CT (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/212,521

(22) Filed: Dec. 6, 2018

(65) Prior Publication Data

US 2019/0108733 A1    Apr. 11, 2019

Related U.S. Application Data

(63) Continuation-in-part of application No. 15/604,541, filed on May 24, 2017, which is a continuation of application No. 13/603,328, filed on Sep. 4, 2012, now abandoned.

(51) Int. Cl.
*G08B 7/06* (2006.01)
*G08B 5/22* (2006.01)
*G08B 3/10* (2006.01)

(52) U.S. Cl.
CPC ....................... *G08B 7/06* (2013.01)

(58) Field of Classification Search
None
See application file for complete search history.

(56) References Cited

U.S. PATENT DOCUMENTS

| 6,236,303 B1 | 5/2001 | Wagner et al. |
| 7,053,757 B2 * | 5/2006 | Buckingham ............ G08B 3/10 340/328 |
| 2006/0049954 A1 * | 3/2006 | Mohamed .............. B60Q 1/503 340/692 |

(Continued)

FOREIGN PATENT DOCUMENTS

| CN | 101526255 A | 9/2009 |
| CN | 201897291 U | 7/2011 |

(Continued)

OTHER PUBLICATIONS

INNCOM, "Application Note 219 Volatile Organic Chemical (VOC) Test Setup," Revision 1.00, 10 pages, 2009.

*Primary Examiner* — John F Mortell
(74) *Attorney, Agent, or Firm* — Seager, Tufte & Wickhem LLP

(57) ABSTRACT

An interface component for insertion in a certain-sized connection box placed for another component such as a switch or other electrical mechanism. The interface component may bring in new capabilities plus maintain the capabilities of the removed component. The box need not be removed, or if the boxed is removed the structure or space encompassing the box need not be enlarged. Further, no new wiring is necessarily needed. This placement or substitution may be particularly applicable to rooms of hotels, motels, and other similar facilities. Neither time nor expense of redoing structure to hold a larger box or provide more space or wiring is needed. In many cases, there is not adequate space to add components for providing additional capabilities to a room.

8 Claims, 11 Drawing Sheets

(56) References Cited

U.S. PATENT DOCUMENTS

2007/0120978 A1* 5/2007 Jones .................... G08B 25/00
  348/143
2014/0062659 A1   3/2014 Roosli et al.
2014/0190679 A1   7/2014 Roosli et al.

FOREIGN PATENT DOCUMENTS

| CN | 201916230 U | 8/2011 |
| CN | 202145038 U | 2/2012 |
| EP |   2458570 A1 | 5/2012 |

* cited by examiner

INTERFACE ASSEMBLY

This application is a Continuation-in-Part of U.S. patent application Ser. No. 15/604,541, filed May 24, 2017, which is a Continuation of U.S. patent application Ser. No. 13/603,328, filed Sep. 4, 2012. U.S. patent application Ser. No. 15/604,541, filed May 24, 2017, is hereby incorporated by reference. U.S. patent application Ser. No. 13/603,328, filed Sep. 4, 2012, is hereby incorporated by reference.

BACKGROUND

The present disclosure pertains to wall-mounted mechanisms in rooms of multi-room buildings, and particularly to mechanisms to facilitate requests by guests of the rooms.

SUMMARY

The disclosure reveals an interface assembly for insertion in a certain-sized connection box in lieu of another component such as a switch or other electrical component. The replacement may bring in new capabilities plus maintain the capabilities of the removed component. The box need not be removed, or if the box is removed the structure or space encompassing the box need not be enlarged. Further, no new wiring is needed. This replacement or substitution may be particularly applicable to rooms of hotels, motels, and other similar facilities. Neither time nor expense of redoing structure to hold a larger box or provide more space is needed. In many cases, there is not adequate space to add components for providing additional capabilities to the rooms.

DESCRIPTION

Figure 1:
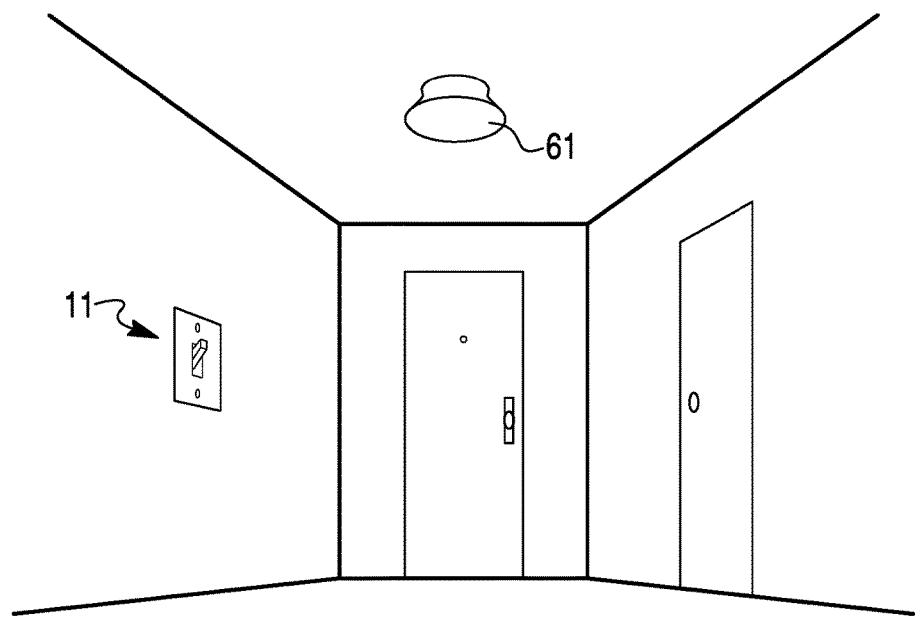
FIG. 1 is a diagram showing an example of available space for a multi-functional item in a room.

Often in the past, electrical wallbox-mounted door bell chimes have been used through the hotel industry. They were single-gang chimes. These chimes may typically include buttons and indicators to set and clear room status information, such as Privacy/Do Not Disturb (DND) and Service/Make-Up-Room. For the reason of having these features reasonably accessible to the user, most of the time, door bell chimes may be mounted in the entry way. This mounting may typically require a double gang box at the same location where a light switch or dimmer is mounted that is used to operate a light load external to the device, e.g., a lighting fixture, in a hallway or an entry of the guestroom.

"Room" noted herein may refer to a unit in a hotel, motel, multiplex residence, multi-party home, and the like. "Room" here may refer to the unit which incorporates integral rooms. The term "room" as referred to in the present description may actually contain one or more integral rooms such as a bathroom, a sleeping area, a study, a closet, and so forth within the room. "Room" may also refer to a suite which could have one or more integral rooms within the room or suite.

In retrofit applications, there generally are no spare gangs at the wallboxes of guestrooms. Adding a door bell device may typically require one to either change the wallbox or to completely rewire the wallbox. In some retrofit instances, changing the wallbox is not necessarily an option as there is often no space available to mount another or larger box. Rewiring might demand expensive labor and sometimes is not necessarily possible because of limitations as to what can be done structurally to the room.

Combining the parts of a door bell (sounder) with the light actuating device, such as a relay or dimmer, may elegantly solve this dilemma and create competitive advantages because of greatly reduced costs of adding a door bell system to an existing component of a room.

There may be an integration of a relay, FET or triac to operate a lighting load, chime circuitry containing a sound outputting device such as a speaker, a user actuated interface such as a push button to operate a light, a user actuated interface to operate the status of one of Privacy/Do Not Disturb or Service/Make-Up-Room and a power supply to operate this device. Adding a wired or wireless communication capability to signal the status of Privacy/DND or Service/Make-Up-Room to one or multiple auxiliary locations, such as hallway plates or central status monitoring systems, may be incorporated. The communication capability to allow control of the light actuating device from remote locations may be utilized. The communication capability to control other devices in a building automation system by assigning additional functions to the buttons of the device may be utilized.

The present device may feature a light actuator, an RF wireless radio subsystem, and importantly have a replacement of a light switch in a single gang electrical box without needing further fabrication. The term "present" may refer to the device, assembly, approach system, and the like that is the subject of this description and claims.

One may imagine for example a hotel entry door situation. When one enters through the door, just to the left or right, there may normally be a single gang wall box that contains a switch that controls, for example, a light above in the hallway of the room. With the present device, one may replace the normal wall switch with the new device that not only can switch the light itself but contain all elements of a door bell, and can communicate through a wireless medium along with other aspects of a building control system or a guest room.

Without the presented solutions, one may have to, at great costs, replace the single gang box with a double gang box (which may include dry wall work and electrician work) and then install two devices side-by-side (e.g., a networkable light controller and a door bell or chime device). This present state of affairs may be greatly improved and overcome by the present device.

The present device may have two switches for selection of "Do Not Disturb" (DND) and a "Make Up Room" (MUR). The guest may choose either the DND or MUR functions without opening the guest room door. If DND is pressed, a lettered, backlit "Do Not Disturb" indicator may be displayed on the external door plate. If MUR is selected, a discreet LED indicator, readable only by hotel staff, may be displayed on the external plate.

The "Do Not Disturb" and "Make Up Room" functions may be activated from the plate, or from any one of other guestroom control devices. When one of the DND or MUR switches on the present device is pressed, a small LED inside the switch may be illuminated, so that the guest knows that function has been activated. Additionally, when the DND command is activated by the guest, the present system may also disable the door chime, divert incoming calls to voice mail, and cancel any active MUR requests.

As to guest status, DND and MUR requests may be automatically reported to a floor status monitor for use by housekeeping and other staff. Both conditions may be automatically cancelled upon guest check out.

The present device may be is mounted in one of several ways. When installed during construction, a standard, single gang low-voltage junction box may be mounted directly on the wall stud, and the present device may be secured to the wall stud with standard screws, or the original component may be replaced with the present device in the same space.

The present device may incorporate an aesthetically pleasing faceplate, a DND feature that reduces intrusions on guests, a MUR feature that lessens housekeeping labor, eliminates the expense and need for bothersome hanging doorknob tags, enhances guest satisfaction, and so on.

No. 8 mounting screws may be vertically placed about 3.28 inches apart if the mounting is a typical standard single gang junction box. A minimum box depth of about 1.25 inches may be required. The device may have, for instance, example dimensions of about 3.9"H×1.7"W×1.2"D. The dimensions may be other ones as long as the device fits in the single gang junction box or other desired and/or already pre-installed box. The dimensions may different for another kind of box. The present device may also have other specifications.

The present system and approach, as described herein and/or shown in the Figures, may incorporate one or more processors, computers, controllers, user interfaces, wireless and/or wire connections, and/or the like, wherever desired.

Figure 2:
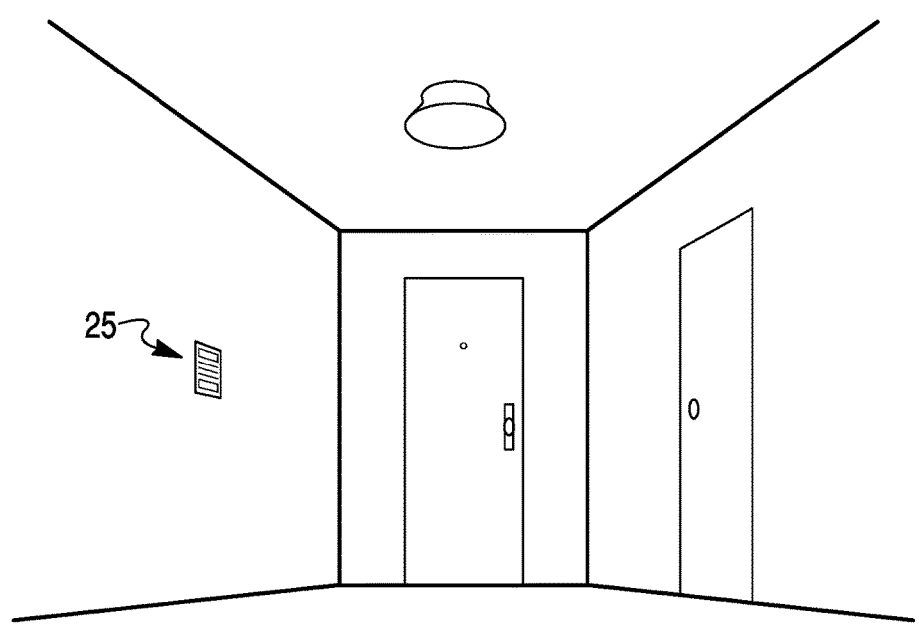
FIG. 2 is a diagram of the multi-functional item as replacement for another component the room wall.
Figure 3:
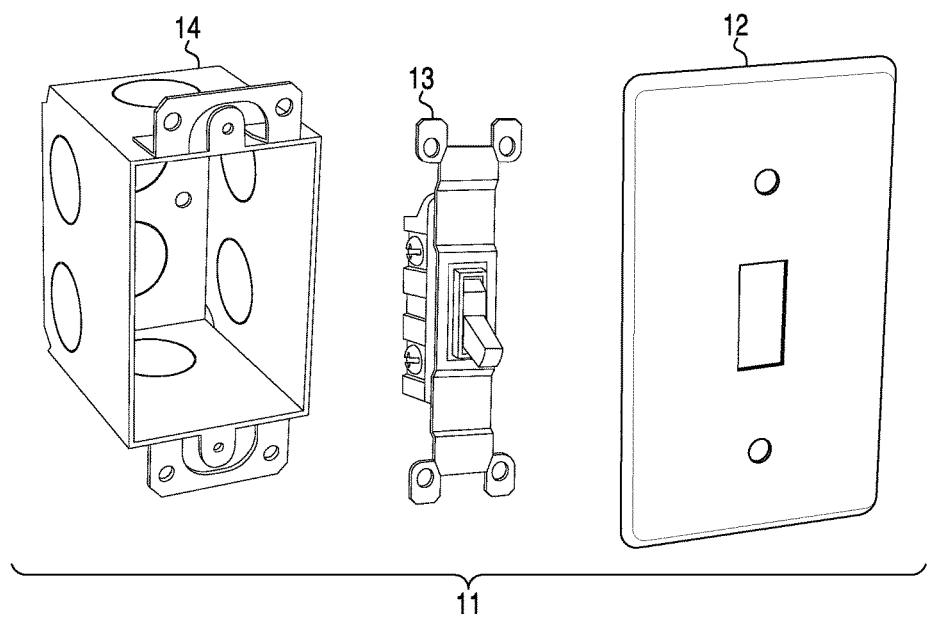
FIG. 3 is a diagram of a wall plate that may be removed from a switch which in turn may be removed from an electrical connection box.

FIG. 1 is a diagram showing an example of available space for a multi-functional item such as an interface assembly in a guestroom that may replace such things as a light switch assembly 11 situated in a wall of the room. FIG. 2 is a diagram of a replacement item 25 on the room wall. FIG. 3 is a diagram of a wall plate 12 that may be removed from a switch 13 and a single gang electrical connection box 14. Switch 13 may be removed from the single gang box 14. Item 25 may be connected to the wires in box 14 and inserted into box 14. Item 25 may be, for example, regarded as an interface assembly 25.

Figure 4:
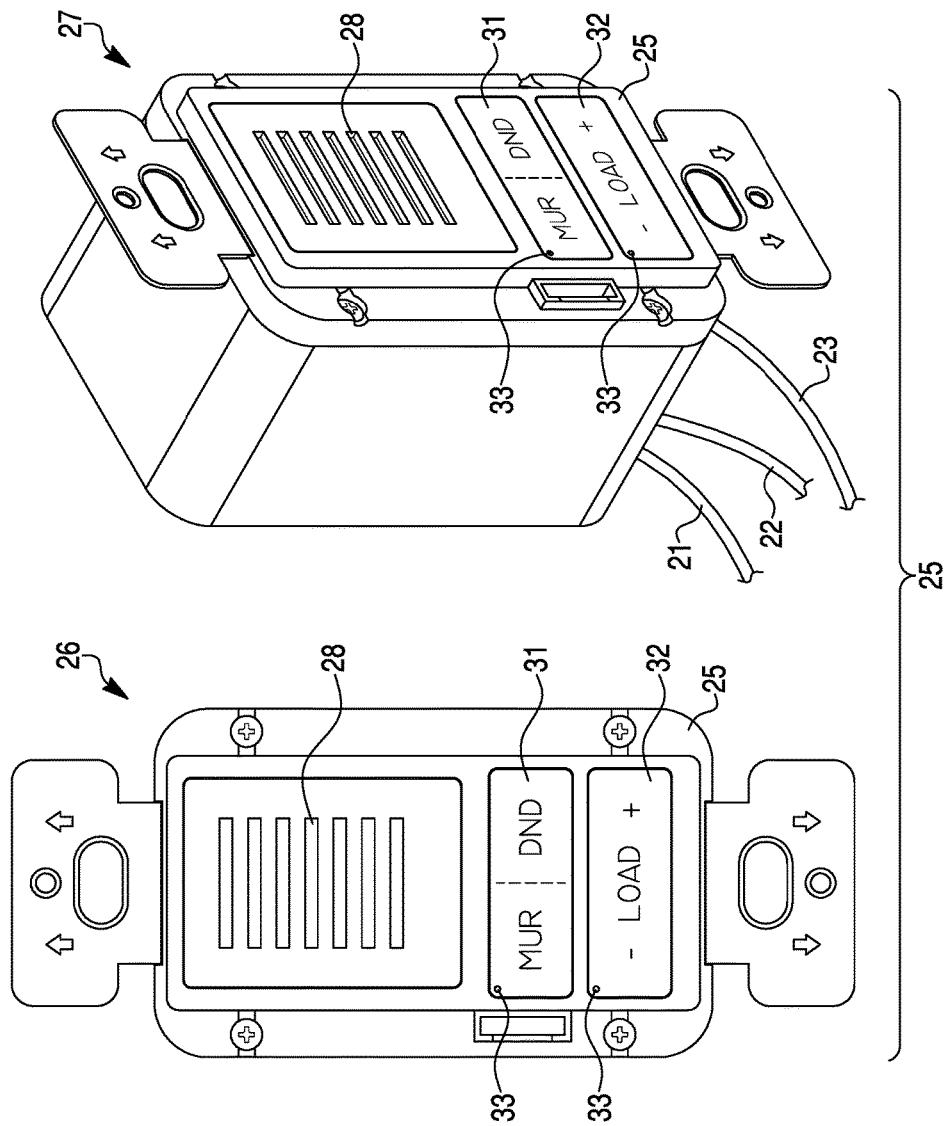
FIGS. 4, 5 and 6 are diagrams of example interface assemblies that may be inserted in place of an electrical component space or box.

FIG. 4 illustrates interface assembly 25 for insertion in connection box 14 of FIG. 3. Diagram 26 is a front view of interface assembly 25. Diagram 27 is a perspective view of interface assembly 25. Slots 28 may be for emanating sound such as chimes and audio messages. Slots 28 may be utilized for receiving sounds such as those of voice for a microphone. Switches 31 and 32 may be for indicating "Privacy" or "Do Not Disturb", and for "Service" or "Make Up Room", or controlling the switched light load. There may be more switches for requesting other actions and for restraint or stoppage of certain actions. Each switch may have an LED light 33 which indicates an activation of a request made by pressing the respective button 31 or 32. Three wires 21, 22 and 23 such as a phase, neutral and load wires, respectively, may be connected to interface assembly 25. In some cases or areas of location, there may be a ground or earth wire connected to assembly 25.

Switch 31 may be a rocker switch with a middle neutral or off position. It may be labeled as "Privacy", MUR (Make Up Room), Service and DND (Do Not Disturb", or other applicable terminology. Switch 31 may be spring loaded in that if one presses it to the left side it may make a momentary contact to activate the MUR indication to housekeeping, and others as applicable. Switch 31 may be pressed to the right side, in the same manner as to the left side, to make a momentary contact to activate the DND indication to housekeeping, and others as applicable. Switch 32 may be a single action button switch or it may be a rocker switch like switch 31. As a button, switch 32 may be for turning on or off a load. As a spring loaded rocker switch that returns to a middle position with out external pressure, switch 32 may be pressed to the right to click or turn on power to the load or to the left to click or turn off the load. Switch 32 still as a rocker switch may be pressed to the right to turn power on to some extent or to left to turn off power to some extent. The extent may mean the when the switch is held down to the right side, the amount of voltage applied to the load gradually increases and stops at a voltage when the switch is no longer held down. The extent may also mean the when the switch is held down to the left side, the amount of voltage applied to the load gradually decreases and stops at a voltage when the switch is no longer held down. Holding the switch down to the left will eventually result in zero voltage to the load. Likewise, holding the switch down to the right will eventually result in a maximum voltage applied to the load. The load may be an entry hall light in the room which may be increased or decreased in intensity with switch 32 being utilized as a dimmer switch. Alternatively, switch 32 may be a momentary contact button or an on/off toggle switch. Assembly 25 may have additional switches for various other functions, such as adjusting, for example, a thermostat temperature, fan speed, or speaker volume. Also, switch 31, switch 32 and other possibly added switches implemented in interface assembly 25 may be selected from an assortment of various types of switches not necessarily mentioned herein.

Figure 5:
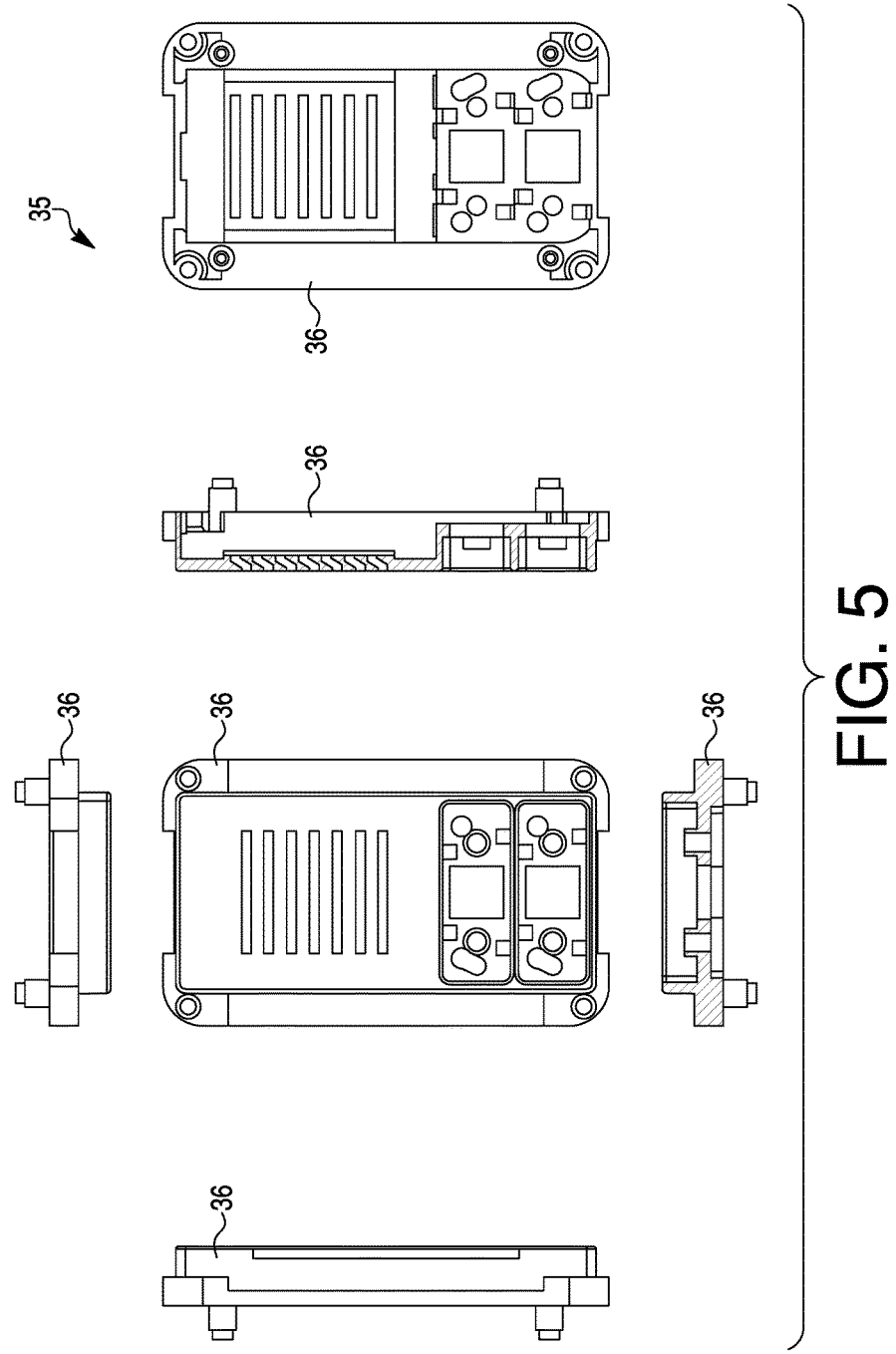
Figure 6:
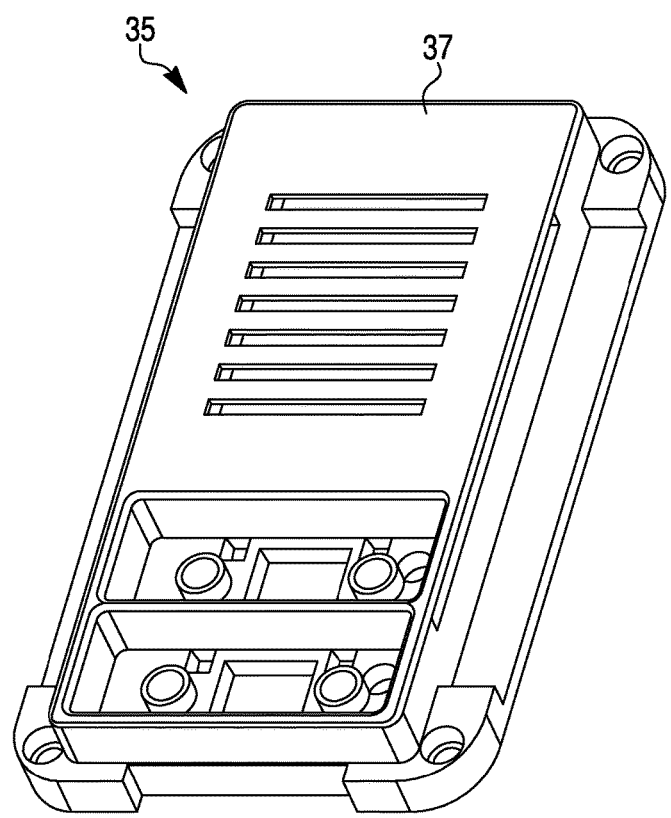

FIG. 5 is a diagram of a set of views of a housing 35 of an example version of interface assembly 25 used in lieu of an electrical component in a connection box such as box 14 in FIG. 1. Side, end, front and back views 36 are shown. Not all components of interface assembly 25 are necessarily shown in FIG. 5. FIG. 6 is a diagram showing a perspective view 37 of housing 35.

Figure 7:
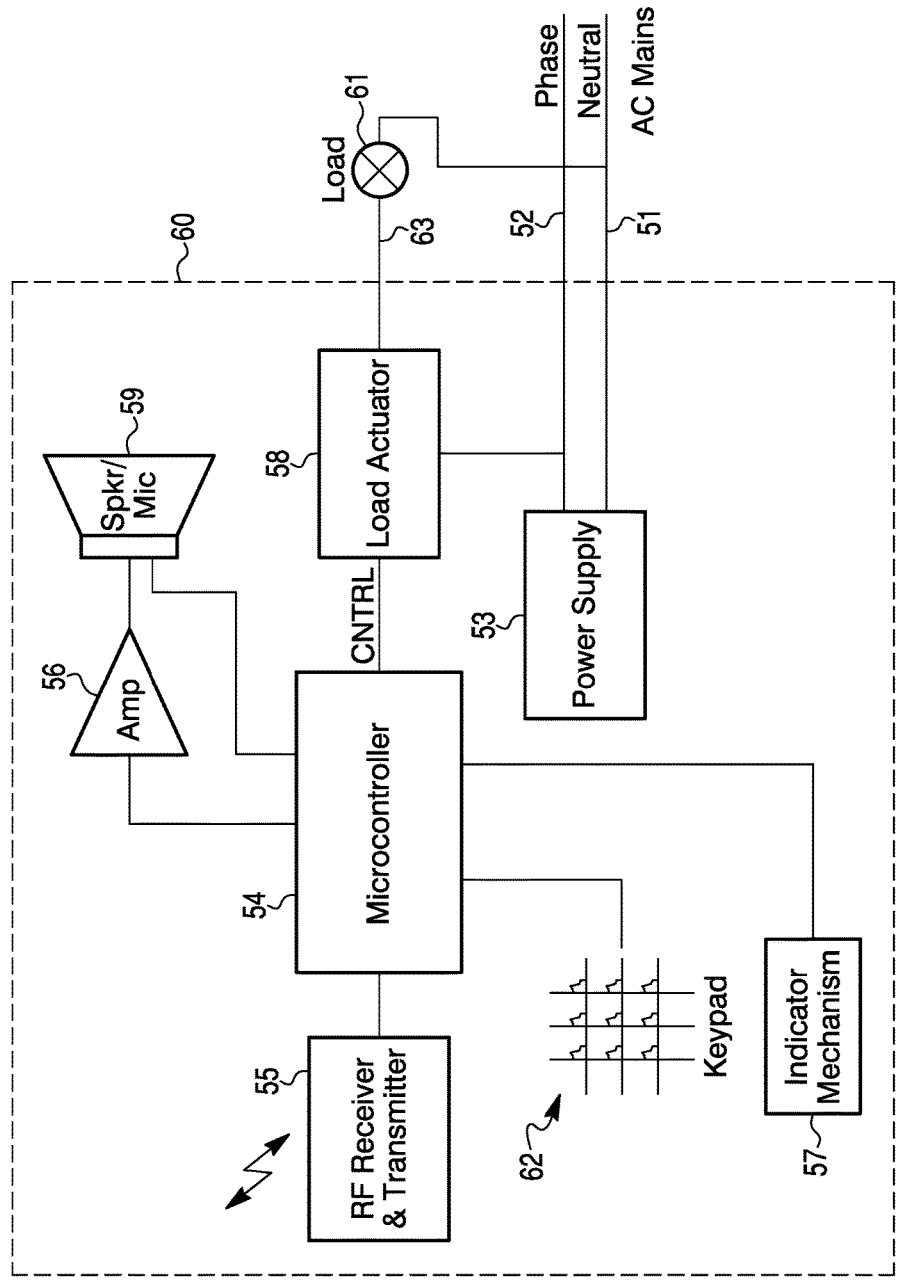
FIG. 7 is a diagram of a schematic showing an example electronics circuit for an interface assembly.

FIG. 7 is a schematic of an example electronics circuit 60 of an interface assembly 25 for an existing connection box 14 previously having had a different electrical component 13 such as a switch for a load 61 like an entry hall light. Other circuit designs may be used for electronics 60. When the electrical component 13 such as a light switch as in FIG. 1 is removed from connection box 14, a replacement item being like interface assembly 25, may have electronics, for example, like that of circuit 60.

Several wires may exist in box 14 after the previous component 13 is removed. The wires may be a neutral line 51 (e.g., ground), a phase line 52 (e.g., 112 VAC) and a load wire 63. Lines 51 and 52 may go to a power supply 53 for converting a line voltage to different magnitudes of voltage for various portions of the circuit such as micro controller 54, RF receiver and transmitter (e.g., a transponder) 55, amplifier 56, indicating mechanism 57, and so forth. Line 52 may also be connected to a load actuator 58 which can be an electrically operated switch, such as a triac, FET, relay and so forth, for controlling power via wire 63 to load 61, which may be a light, fan, or some other device or appliance.

Amplifier 56 may be a driver of signals from the microcontroller 54 to a speaker 59. Load actuator 58 may be, for example, an electrical replacement of the electrical component 13 removed from box 14 such as a switch, dimmer or other item. Actuator 58 may be connected to electrical load 61 which could be a hall light, or other device or appliance generally in the room controlled by interface assembly 25.

Microcontroller 54 may be connected to load actuator 58 and to an RF receiver and transmitter 55. A keypad 62, having such things as switches, may be connected to microcontroller 54. Inputs to keypad 62 may provide signals for controlling load actuator 58, receiver and transmitter 55, sound output to amplifier 56 and speaker 59, and sound input from microphone 59. Various requests, such as room privacy and service, and information may be input at keypad 62 for microcontroller to be appropriately provided as signals to be transmitted from transmitter 52 to various places like recipients in the multi-room building. Signals via the wireless transponder 55 may be provided in lieu of signals from keypad 62, for example, such as signals to load actuator 58.

Figure 8:
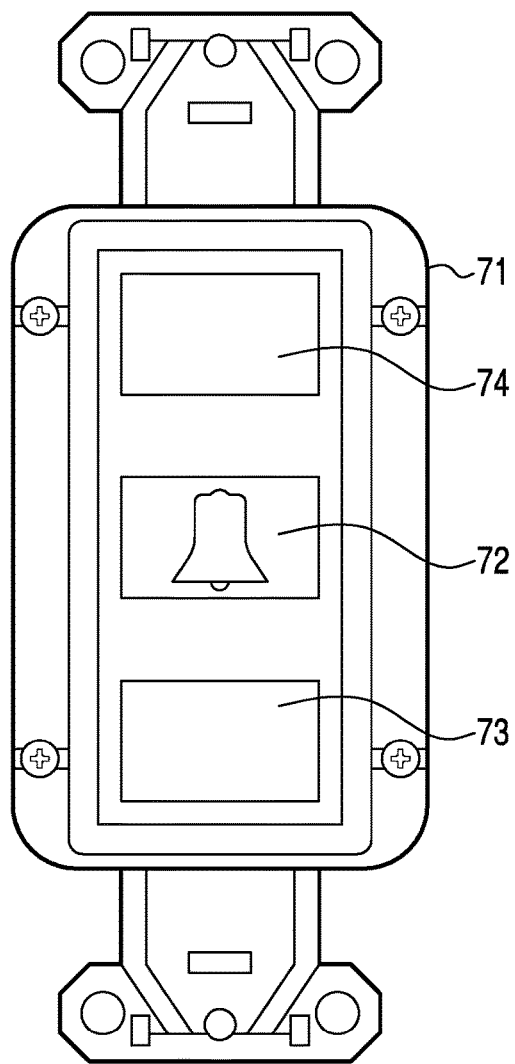
FIG. 8 is a diagram revealing a door chime sending unit for the outside of an entry door to a room.

FIG. 8 is a diagram revealing a door chime sending unit 71 for the outside of an entry door for a guest room. Unit 71 may have a button or switch 72 for providing a bell or chime signal to interface assembly 25. Unit 71 may have a wireless transmitter that sends the signal to receiver 55 of circuit 60 of the interface assembly, which in turn provides a bell or chime sound over speaker 59 and emanating through slots 28 of assembly 25 (FIG. 4), provided that the do not disturb selection is not activated at the interface assembly. The bell or chime signal may instead be sent from unit 71 to apparatus 25 via a wire connection. In a similar manner under the same conditions, a person such as a housekeeper with an appropriate activation mechanism may speak or provide an audio message via a microphone 73 to the room guest.

Assembly 25 may be a recipient of messages and announcements that are public in nature relative to the multi-room building. If do-not-disturb selection is activated, the messages and announcements will not necessarily be provided to speaker 59. However, high priority messages, such as emergency messages, will be provided to speaker 59 despite the activation of the do-not-disturb selection. Sounds for speaker 59, such as alert alarms and fire siren sounds, may also override the do-not-disturb selection.

Figure 9:
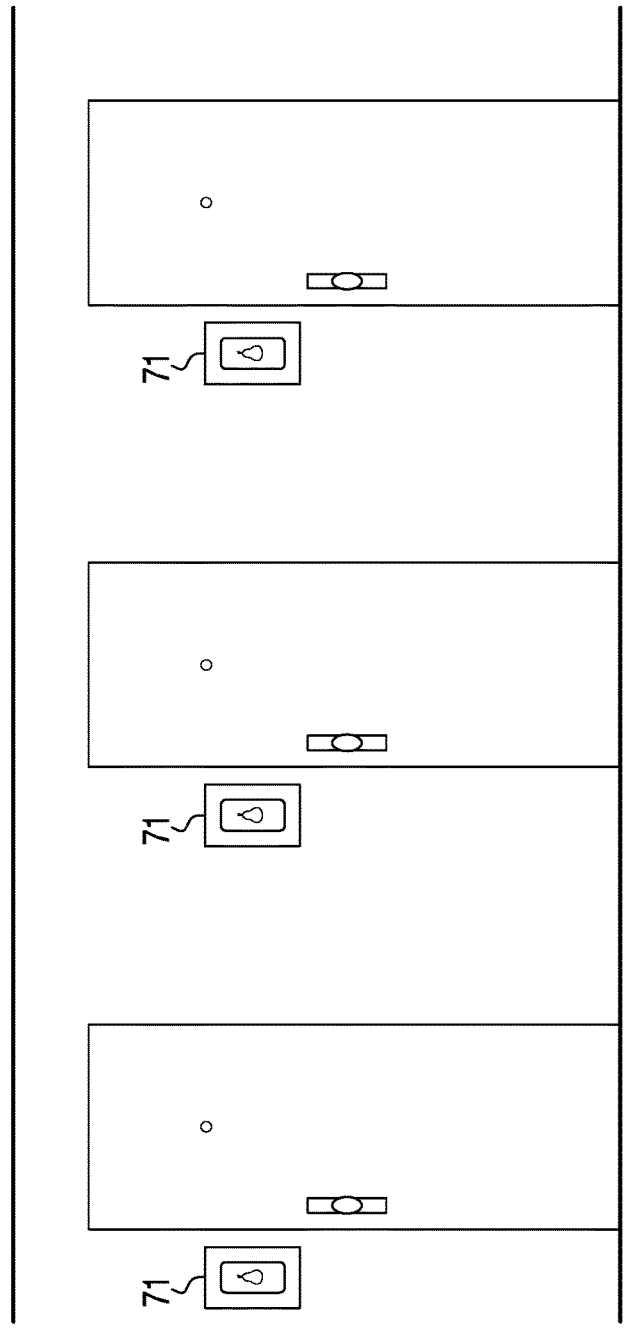
FIG. 9 is a diagram showing a sending unit proximate to an entry door for each of several rooms.

FIG. 9 is a diagram of a unit 71 proximate to an entry door for each of the rooms. Unit 71 may also provide visual messages to, for example, housekeeping or other staff in a display 74 as shown in FIG. 9. The visual messages may incorporate "do not disturb", "make up room", and other information. Information on display 74 will not necessarily be visible to just anyone walking down the hall. A housekeeping staff member may use a secret button in the hallway, a key, code or other mechanism in order to see the information on display 74. These messages may also be transmitted to a wireless receiver in unit 71 from transmitter 55 of circuit 60 in the wall interface assembly of the guest room. The housekeeping staff member may provide or leave a message or response via unit 71 for the room guest. Signals between unit 71 and assembly 25 may instead or also be conveyed by wire. Signals between other places and apparatus 25 may be sent and received via wire or wireless media.

To recap, a system, for installation of an interface assembly, may incorporate an electrical box in a wall of a room for an electrical component, and a room occupant interface assembly installed in the electrical box in lieu of an electrical component. The interface assembly may incorporate an audio speaker, a first switch mechanism for controlling a load in the room, and a second switch mechanism for sending a make-up-room message or a do-not-disturb message. The electrical box may be a single gang electrical box. The load may be a light in the room.

The interface assembly may further incorporate a microcontroller connected to the first and second switch mechanisms, the audio speaker and/or a microphone connected to the microcontroller, and a transmitter and/or receiver connected to the microcontroller.

If a switch mechanism is activated for a certain action, then a light proximate to or in the switch mechanism may light up to indicate that the action has been activated. If an action has been activated with the second switch mechanism, then the action may be reported to a main desk or floor status monitor for reference by housekeeping or other staff, respectively. A signal for reporting an action to the main desk or floor status monitor may be communicated via a transmitter of the interface assembly to a receiver that receives the signal via a wire and/or wireless mechanism for the main desk or floor status monitor.

The system may further incorporate a third switch mechanism attached proximate to outside of an entry door to the room. The third switch mechanism may transmit a signal to the interface assembly for sounding a chime or providing a notice or message for a room occupant.

The system may further incorporate a faceplate situated outside a door of the room. The faceplate may indicate to a housekeeping staff a status of the room. The faceplate may have a receiver that receives signals from the interface assembly for indicating any message such as make-up-room or do-not-disturb provided by the room occupant.

An electrical assembly for a room may incorporate an interface component for insertion in a single gang electrical box of a room. The interface component may have a microcontroller, a chime connected to the microcontroller, and a load actuator for controlling a load in the room. The load may be a light in the room. The load actuator may be selected from a group consisting of a relay, a TRIAC and a FET.

The assembly may further incorporate a wireless transponder connected to the microcontroller. The assembly may also incorporate a switch for requesting room service and/or privacy. The switch may be connected to the microcontroller.

The assembly may further incorporate a switch for controlling a state of the load actuator. The switch may be connected to the load actuator.

The assembly may also incorporate a switch, for controlling a state of the load actuator, in a remote device. The switch may be connected to the wireless transponder.

The interface component may replace an already existing electrical component in the electrical box. The electrical component may be a light switch.

The speaker may be capable of outputting a chime sound and an audio stream. If a switch is effected for privacy, then the speaker may be disabled except for emergency messages and sounds, incoming calls may be diverted to voice mail, and/or room service may be cancelled.

An approach, for installing an interface component assembly in a room, may incorporate installing an interface component in an existing electrical box or space for an electrical box in the room. The interface component may have an audio speaker, and a load actuator for controlling a load in the room. The load may be a light in the room. The electrical box may be a single gang electrical box. The speaker may provide a chime sound and/or an audio stream. The existing box may be for a light switch.

The room may be in a multi-room building, such as a hotel, motel, multiplex residence, and the like. The interface component may have a microcontroller connected to one or more switches, a load actuator and the speaker, and have a wireless transponder connected to the microcontroller for receiving signals to provide the chime sound or audio stream to the speaker and/or for sending signals from the interface component to request privacy or room service.

The approach may further incorporate a button outside of and by an entry door to the room in a common hallway of a multitude of rooms, for sending a signal to sound a chime via the speaker in the room.

Figure 10:
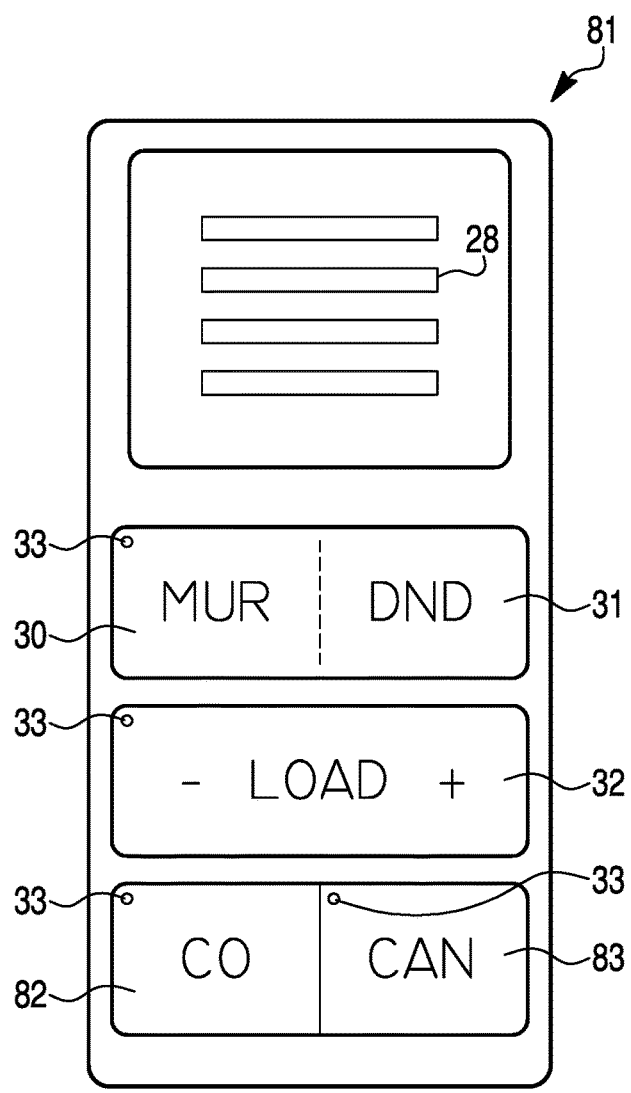
FIG. 10 is a diagram of an illustrative interface assembly in a room of a multi-room facility.

FIG. 10 is a diagram illustrating an interface assembly 81 for insertion in connection box 14 of FIG. 3. Slots 28 may be for emanating sound such as chimes and audio messages. Slots may also be for receiving sounds such as those to a microphone in assembly 81. Button switches 30, 31, 32, 82 and 83 may be for indicating "Make Up Room" (MUR), "Do Not Disturb" (DND), "Controlling a Load" (LOAD), "Check Out" (CO), and "Cancel" (CAN), respectively. The load may be such things as lighting, ventilation, heating, cooling, plug outlets, and so on.

Each button may have an indicator light 33 that reveals an activation of a request (i.e., MUR, DND, −LOAD+, CO or CAN) when a button switch 30, 31, 32, 82 or 83, respectively, is pressed. Pressing button switch 82 (CO) may check out the guest of the room with a signal to the front desk and/or from outside unit 71 (FIG. 9) next to the entry door of the guest room, to front desk 91. Pressing button switch 82 may cause the guest to be checked out via the front desk 91, central computer 92, server 93 and network 94 to microcontroller (uC) 54, which causes a "Do Not Disturb" (DND) request to be automatically cleared if previously set. Pressing button switch 83 (CAN) may cancel a check-out signal from button switch 82 if pressed within a certain period of time (e.g., 10 minutes or the like). Pressing button switch 83 again later within a certain period time (e.g., 5 seconds or the like) of the previous press, may cancel, clear or revoke the DND button switch 31 request and/or cancel, clear or revoke the MUR button switch 30 request. The relevant indication light or lights 33 may turn off when a request is canceled, cleared or revoked.

A keypad 62 of FIG. 7 may represent button switches 30, 31, 32, 82 and 83, having connections to microcontroller 54, for transmission of indicated signals to and from microcontroller 54. Wireless transponder 55 may be provided for transmission and receipt of signals between button switches 30-32, 82 and 83 at interface assembly 81 and microcontroller 54.

Figure 11:
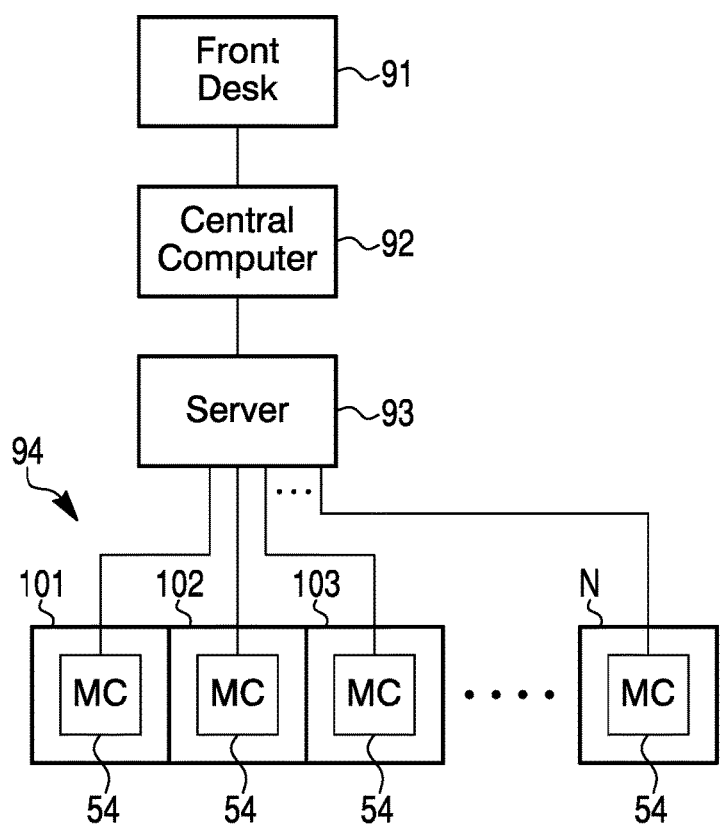
FIG. 11 is a diagram of an illustrative layout of components incorporated in a room management system, including guest check-in and checkout, for the facility.

A checkout information may be provided to a front desk 91, in FIG. 11, where some person or mechanism would receive from a guest of the room. A human aspect (a guest, hotel desk clerk, or the like) may initiate a checkout. The checkout information may be provided to front desk 91 in person, by cell phone, via a facility staff person, or in some other way. The information may be entered in a central computer 92 of a facility of rooms, such as a hotel. The information may include a room number for which the checkout is applicable. The checkout information, associated with the room number, may go to a server 93. Server 93 may be incorporated in central computer 92 or vice versa, or computer 92 may also perform the function of, or in lieu of, server 93, if needed, or vice versa.

Server 93 may be connected to a network 94 of lines or connections to the microcontrollers 54 of the rooms that may be numbered 101, 102, 103, . . . , N. The lines or connections may be wire or wireless. A checkout signal may go from server 93 along an appropriate line to microcomputer 54 at the room checked out of by the guest. The checkout signal may incorporate a clear portion that may cause microcomputer 54 to then automatically clear any setting of a DND button switch 31 entry and associated indicator light 33 of interface assembly 81.

Figure 12:
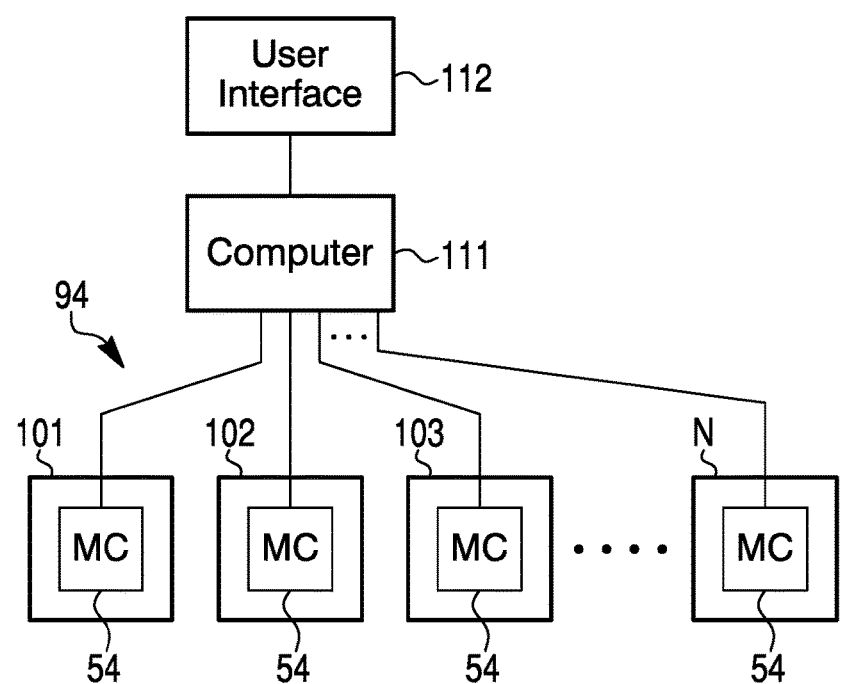
FIG. 12 is a diagram of an alternative layout of components incorporated in the room management system for the facility.

Alternatively, in FIG. 12, a checkout may be entered or initiated by some human person, to a processor or computer 111 at front desk 91. The computer 111 may be at another location or on a cloud. A user interface 112 may be at the front desk for an entry of a checkout by a clerk or the user interface 112 may be situated as a kiosk for the guest to use for checkout.

User interface 112 may be connected to computer 111. The computer 111 may operate as a combined central computer and a server, or in lieu of each other, as desired. An output of computer 111 may go to a network 94. The output may be a signal with the checkout information, which may go to microcomputer 54 at the room being checked out from, by the guest. The checkout information may include various things to be done for a guest checkout, including a clearing of a DND setting at interface assembly 81 in or near the room.

U.S. Pat. No. 7,053,757, issued May 30, 2006, and entitled "Intelligent Door Plate and Chime", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An interface assembly comprising:
    a box in a room for containing one or more components; and
    a first switch situated at the box, the first switch is configured to be actuated to control power to a light in the room and remote from the first switch;
    a second switch situated at the box, the second switch is configured to be actuated to adjust a temperature set point of a thermostat; and
    a third switch situated at the box, the third switch is configured to provide a Do Not Disturb indication upon actuation; and
    wherein the room is a guest room and third switch is configured such that the Do Not Disturb indication provided in response to actuation of the third switch is automatically canceled when a guest checks out of the guest room.

2. The interface assembly of claim 1, wherein the first switch is a spring-loaded rocker switch.

3. The interface assembly of claim 1, further comprising:
a speaker situated at the box; and
wherein actuation of the third switch disables a door chime configured to be played through the speaker.

4. The interface assembly of claim 3, further comprising a fourth switch, wherein the fourth switch is configured to adjust a speaker volume upon actuation.

5. The interface assembly of claim 1, further comprising a third switch situated at the box, wherein the third switch is configured to provide a Make Up Room indication upon actuation.

6. The interface assembly of claim 5, wherein the room is a guest room and the third switch is configured such that the Make Up Room indication provided in response to actuation of the third switch is automatically canceled when a guest checks out of the guest room.

7. The interface assembly of claim 1, wherein the interface assembly further comprises:
a microcontroller connected to the first switch and the second switch; and
a transmitter and/or receiver connected to the microcontroller.

8. The interface assembly of claim 1, wherein if one of the first switch and the second switch is actuated, then a light proximate to the actuated one of the first switch and the second switch lights up to indicate that an action has been activated.

* * * * *